US011814581B2

(12) United States Patent
Al-Taq et al.

(10) Patent No.: US 11,814,581 B2
(45) Date of Patent: Nov. 14, 2023

(54) CORROSION INHIBITING ACID MIXTURE CONTAINING MONOAMINE / DIAMINE AND METHOD OF INHIBITING CORROSION IN ACID TREATMENT

(71) Applicants: SAUDI ARABIAN OIL COMPANY, Dhahran (SA); KING FAHD UNIVERSITY OF PETROLEUM & MINERALS, Dhahran (SA)

(72) Inventors: Ali Abdullah Al-Taq, Qatif (SA); Shaikh Asrof Ali, West Bengal (IN); Abdullah Alrustum, Al-Taraf (SA)

(73) Assignees: SAUDI ARABIAN OIL COMPANY, Dhahran (SA); KING FAHD UNIVERSITY OF PETROLEUM & MINERALS, Dhahran (SA)

( * ) Notice: Subject to any disclaimer, the term of this patent is extended or adjusted under 35 U.S.C. 154(b) by 0 days.

(21) Appl. No.: 17/648,388

(22) Filed: Jan. 19, 2022

(65) Prior Publication Data

US 2023/0227714 A1    Jul. 20, 2023

(51) Int. Cl.
| C09K 8/74 | (2006.01) |
| C09K 8/54 | (2006.01) |
| E21B 37/06 | (2006.01) |
| E21B 43/27 | (2006.01) |

(52) U.S. Cl.
CPC ............. *C09K 8/74* (2013.01); *C09K 8/54* (2013.01); *E21B 37/06* (2013.01); *E21B 43/27* (2020.05); *C09K 2208/32* (2013.01)

(58) Field of Classification Search
CPC ........ C09K 8/74; C09K 8/54; C09K 2208/37; E21B 43/27; E21B 37/06
See application file for complete search history.

(56) References Cited

U.S. PATENT DOCUMENTS

| 3,335,090 | A | 8/1967 | George et al. |
| 3,773,465 | A | 11/1973 | Keeney et al. |
| 3,981,780 | A | 9/1976 | Scherrer et al. |
| 4,498,997 | A | 2/1985 | Walker |
| 4,698,168 | A | 10/1987 | Briggs |
| 4,740,320 | A | 4/1988 | Treybig et al. |
| 5,366,643 | A | 11/1994 | Walker |
| 8,039,422 | B1 | 10/2011 | Al-Zahrani |
| 11,180,856 | B1 * | 11/2021 | Obot .................... C23F 11/185 |
| 2006/0196666 | A1 * | 9/2006 | Al-Taq ................ C04B 41/5016 |
| | | | 166/305.1 |
| 2017/0233872 | A1 * | 8/2017 | Wadekar .................. C09K 8/54 |
| | | | 507/244 |
| 2020/0339871 | A1 * | 10/2020 | Obot ......................... C09K 8/54 |
| 2021/0032759 | A1 * | 2/2021 | Solomon ................. C08L 99/00 |
| 2021/0207019 | A1 | 7/2021 | Elkatatny et al. |

OTHER PUBLICATIONS

Smith et al.; "Acid Corrosion Inhibitors—Are We Getting What We Need?," Journal of Petroleum Technology; SPE-5644-PA; vol. 30; Issue 5; pp. 737-746 (10 pages).
Al-Taq et al.; "Performance of Synthesized Amine-based Corrosion Inhibitors in Concentrated HCI Acid Solutions: Effect of Intensifier", SPE 154957; Society of Petroleum Engineers; May 28, 2012; pp. 1-10 (10 pages).
Al-Taq et al.; "Inhibition Performance of a New Series of Mono-/Diamine-Based Corrosion Inhibitors for HCI Solutions", SPE-114087-PA; Spe Journal; vol. 14; Issue 4; pp. 627-633 (7 pages).
Willars et al.; "The Corrosion of Iron In Hydrochloric Acid: Inhibition By Amines", Surface Technology; vol. 4; Sep. 1, 1976; pp. 465-472 (8 pages).
Braun et al.; "Low Molecular Weight Straight-Chain Amines As Corrosion Inhibitors", Corrosion Science; vol. 34; No. 8; pp. 1251-1257 (7 pages).
Ali et al.; "Diallyl-1, 12-diaminododecane-Based Cyclopolymers and Their Use as Inhibitors for Mild Steel Corrosion", Polymer Engineering & Science; vol. 52; Issue 12; pp. 2588-2596 (9 pages).
Haladu, S. A.; "Synthesis of a New Class of Linear and Cross-Linked Polyzwitterion-anions and Their Applications as Corrosion Inhibitors and Adsorbents", King Fand University of Petroleum and Minerals; ProQuest Dissertations Publishing; 2014; with a Concise Explanation of Relevance (270 pages).

\* cited by examiner

*Primary Examiner* — Silvana C Runyan
(74) *Attorney, Agent, or Firm* — Osha Bergman Watanabe & Burton LLP

(57) ABSTRACT

An acid mixture includes hydrochloric acid, a monoamine corrosion inhibitor, and at least one of a diamine corrosion inhibitor and an acid additive. A method for inhibiting corrosion in an acid treatment operation includes introducing an acid mixture comprising hydrochloric acid and a monoamine corrosion inhibitor into at least one of a subterranean formation and subterranean wellbore. The method also includes maintaining the amount of the monoamine corrosion inhibitor in the acid mixture in the subterranean formation and/or the subterranean wellbore in a range of 10 ppm to 400 ppm for the duration of the acid treatment operation. The corrosion rate of steel parts of an acidic fluid circulation system in the acid mixture may be within an acceptable corrosion rate in a temperature range of 20° C. to 135° C.

6 Claims, 3 Drawing Sheets

CORROSION INHIBITING ACID MIXTURE CONTAINING MONOAMINE / DIAMINE AND METHOD OF INHIBITING CORROSION IN ACID TREATMENT

BACKGROUND

Acidizing or acid treatment is one of the most widely used and effective techniques available in the oil and gas industry to improve the oil and gas productivity of a wellbore or a subterranean formation ("formation"). Acid treatment includes acid washing and "pickling," which the wellbore or the equipment used in oil and gas extraction is cleaned with acidic fluid to remove rust, scale and/or other deposits and debris that are restricting the fluid flow. Acid treatment may also include matrix acidizing or stimulation, which the acidic fluid is injected into the formation at a pressure below the formation fracturing pressure to dissolve a portion of the formation to improve fluid flow, and fracture acidizing, which the acidic fluid is injected into the formation at a pressure above the fracturing pressure.

Acid treatment operation involves pumping acid into a wellbore or formation using a fluid circulation system that may include parts such as pumps, mixing tanks, coiled tubing, injection tubing and production tubing. Some of these parts may be entirely or partially made of steel, such as low carbon steel, which is susceptible to acid corrosion. Such acid corrosion causes damages to the fluid circulation system parts which necessitate the acid treatment operation to be halted for parts repair and replacement. In addition, acid corrosion of steel may result in the formation of iron ions which may further react with ions that may be found in the formation fluid to produce precipitates, which reduces the permeability of the formation. Such acid corrosion is further accelerated in an elevated temperature condition often encountered in the subterranean formation and wellbore. In addition, the acid treatment often involves the use of acid having a substantially high concentration to improve the efficiency of the acid treatment, and such acid further contributing to the acid corrosion of the fluid circulation system.

Conventional corrosion inhibitors are generally used in the acid treatment operation. However, conventional corrosion inhibitors are often ineffective against severe acid corrosion, particularly under a high temperature or high acidity conditions. In order to compensate for their ineffectiveness, a higher dosage may be required to retard the acid corrosion process, which leads to an increased operational cost. Accordingly, there exists a need for continuing improvement of the corrosion inhibitor for acid treatment.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein generally relate to an acid mixture including hydrochloric acid, a monoamine corrosion inhibitor, and at least one of a diamine corrosion inhibitor and an acid additive.

In another aspect, embodiments disclosed herein generally relate to a method for inhibiting corrosion in an acid treatment operation. The method may include introducing an acid mixture comprising hydrochloric acid and a monoamine corrosion inhibitor into at least one of a subterranean formation and subterranean wellbore. The method may further include maintaining the amount of the monoamine corrosion inhibitor in the acid mixture in the subterranean formation and/or the subterranean wellbore in a range of 10 ppm to 400 ppm for the duration of the acid treatment operation. The corrosion rate of steel parts of an acidic fluid circulation system in the acid mixture may be within an acceptable corrosion rate in a temperature range of 20° C. to 135° C.

Other aspects and advantages of the claimed subject matter will be apparent from the following description and the appended claims.

DETAILED DESCRIPTION

Figure 1:
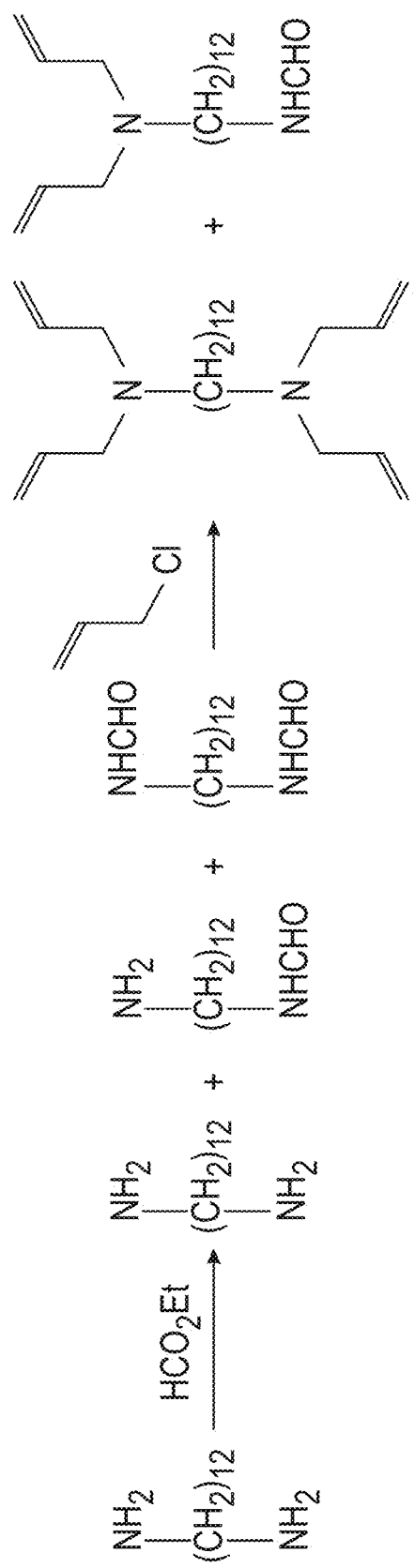
FIG. 1 is a schematic diagram showing exemplary synthesis of N,N-diallyl-N'-formyl-1,12-diaminododacane in accordance with one or more embodiments.

The present disclosure generally relates to an acid mixture for subterranean acid treatment in oil and gas extraction operation, and a method for inhibiting corrosion in the acid treatment operation. The acid mixture provides necessary properties in the acid treatment operation, such as efficient dissolution of formation rocks, while reducing the corrosion of steel under high acidity and high temperature conditions to protect the equipment used in the acid treatment operation. The amount of corrosion inhibitors and acid additives contained in the acid mixture required to provide effective corrosion inhibition properties is substantially lower than conventionally used corrosion inhibitors.

In the present disclosure, acidizing, acid treatment, or acid treatment operation refer to any operation in the oil and gas industry which requires an acidic fluid to be introduced into a wellbore or formation. Acid treatment may include, but is not limited to, acid washing, matrix stimulation, matrix acidizing, fracture acidizing, and "pickling" process. Pickling refers to a process of removing buildup such as rust, scale and other deposits from the surface of oil and gas extraction system or equipment with the use of acidic fluid.

In one aspect, embodiments herein relate to an acid mixture for subterranean acid treatment comprising hydrochloric acid, a monoamine corrosion inhibitor, and at least one of diamine corrosion inhibitor and an acid additive.

Monoamine Corrosion Inhibitor

In one or more embodiments, the acid mixture may contain a monoamine corrosion inhibitor (MCI). The MCI refers to a compound having one amine group in the molecule, and is capable of reducing the corrosive characteristics of acid on metals, when incorporated into the acid. In one or more embodiments, the MCI may further contain at least one of alkene and alkyne group. Alkene and alkyne groups are unsaturated hydrocarbon groups containing a carbon-carbon double bond and a carbon-carbon triple bond, respectively, and may include allyl group and propargyl group. Incorporation of alkene/alkyne groups in the MCI may increase the adsorption sites of the MCI onto the metal surfaces, providing improved corrosion inhibition properties. The alkyne group may also react with the metal surface such that the MCI forms a stable coating on the metal surface.

In one or more embodiments, the MCI may be N, N-diallyl N-propargyl 1-dodecyl ammonium chloride, as represented by the formula below:

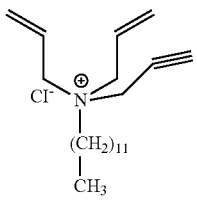

N, N-diallyl N-propargyl 1-dodecyl ammonium chloride contains two allyl groups and one propargyl group, and may be synthesized by first reacting dodecylamine with allyl chloride in a molar ratio of 1 to 2 to produce N,N-diallyl-dodecylamine (step 1), and then further reacting N,N-diallyldodecylamine with propargyl chloride (step 2). The reactions may be shown as follows:

[step 1]

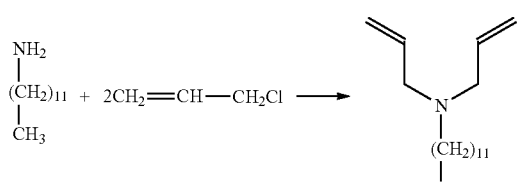

[step 2]

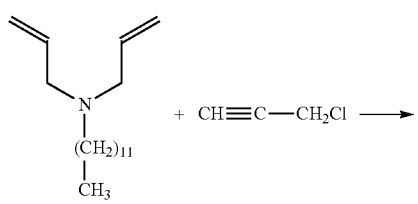

-continued

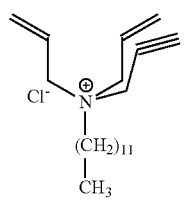

A production example of N, N-diallyl N-propargyl 1-dodecyl ammonium chloride is provided as PRODUCTION EXAMPLE 1 in EXAMPLE section.

In one or more embodiments, the acid mixture may contain the MCI in an amount ranging from about 10 parts per million (ppm) to 400 ppm, or 10 mg/l to 400 mg/l, such as in an amount ranging from a lower limit selected from any one of 10, 20, 30, 40, 50, 60, 70, 80, 90 and 100 ppm to an upper limit selected from any one of 350, and 400 ppm, where any lower limit may be paired with any upper limit.

Diamine Corrosion Inhibitor

In one or more embodiments, the acid mixture may contain a diamine corrosion inhibitor (DCI). The DCI refers to a compound having two amine groups in the molecule, and is capable of reducing the corrosive characteristics of acid on metals, when incorporated into the acid. In one or more embodiments, the DCI may further contain at least one of alkene and alkyne group.

In one or more embodiments, the DCI may be N,N-diallyl N-propargyl-N'-formyl-1,12-diaminododacane salt, as represented by the formula below:

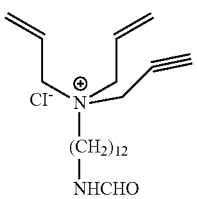

N,N-diallyl N-propargyl-N'-formyl-1,12-diaminododacane salt contains two allyl groups and one propargyl group, and may be synthesized by reacting N,N-diallyl-N'-formyl-1,12-diaminododacane with propargyl chloride. N,N-diallyl-N'-formyl-1,12-diaminododacane may be formed by reacting 1,12-diaminododacane with allyl formyl. An exemplary reaction schematic for the synthesis of N,N-diallyl-N'-formyl-1,12-diaminododacane is shown in FIG. 1. In one or more embodiments, the DCI may be effective in inhibiting hydrogen permeation corrosion, which is generally expected in a very acidic condition.

A production example of N,N-diallyl N-propargyl-N'-formyl-1,12-diaminododacane salt is provided as PRODUCTION EXAMPLE 2 in EXAMPLE section.

In one or more embodiments, the acid mixture may contain the DCI in an amount ranging from about 10 ppm to 400 ppm, such as in an amount ranging from a lower limit selected from any one of 10, 20, 30, 40, 50, 60, 70, 80, 90 and 100 ppm to an upper limit selected from any one of 350, and 400 ppm, where any lower limit may be paired with any upper limit.

In one or more embodiments, the acid mixture may contain the MCI and DCI. In one or more embodiments, a combination of MCI and DCI may provide prevention of pitting corrosion in addition to the reduction in the corrosion rate of metal, when incorporated into acid to produce the acid mixture. In one or more embodiments, the percentage ratio of MCI to DCI content (based on ppm or mg/l) may range from a lower limit selected from any one of 5/95, 10/90, 20/80 to an upper limit selected from any one of 80/20, 90/10 and 95/5, where any lower limit may be paired with any upper limit. In one or more embodiments, the percentage ratio of MCI to DCI content may be one of 30/70, 40/60, 45/55, 50/50, 55/45, 60/40, and 70/30.

Hydrochloric Acid

In one or more embodiments, the acid mixture may contain hydrochloric acid. Hydrochloric acid is often used in the acid treatment operation because it can efficiently dissolve carbonate-based formation, which the subterranean formation may be composed of. The acid mixture may further contain other types of acids, such as hydrofluoric acid, and the quantity and types of acids used may be optimized depending on the constituents of the subterranean formation.

In one or more embodiments, the hydrochloric acid comprised in the acid mixture may have a concentration ranging from about 10 wt % to 30 wt %, such as a lower limit selected from any one of 10, 11, 12, 13, 14, 15, 16, 17, and 18 wt %, to an upper limit selected from any one of 22, 23, 24, 25, 26, 27 28 29 and 30 wt %, where any lower limit may be paired with any upper limit.

Acid Additives

In one or more embodiments, the acid mixture may contain acid additives. Acid additives are compounds generally used in the oil and gas extraction or acid treatment operations for specific purposes and in addition, provide enhanced corrosion inhibition characteristics of the acid mixture when used in combination with MCI and/or DCI. Acid additives may include a hydrogen sulfide ($H_2S$) scavenger, iron control agent, mutual solvent and water-wetting surfactant. Examples of the acid additives may include, but are not limited to, M295 $H_2S$ scavenger, U-66 mutual solvent, F-103 water-wetting surfactant, L-41 chelating agent, and L-58 sequestering agent, all of the above examples available from Schlumberger Technology Corporation, and acetic acid/citric acid mixture as an iron control agent.

In one or more embodiments, the acid mixture may contain acid additives in addition to MCI. A combination of MCI and acid additive may further inhibit the corrosion characteristics of acid, when incorporated into the acid mixture. The corrosion characteristics may be quantified by various parameters including inhibition efficiency %. In other embodiments, the acid mixture may contain acid additives in addition to MCI and DCI.

In one or more embodiments, the acid mixture may contain the acid additives in an amount ranging from about 1 gallon per 1000 gallons of acid mixture (1 gpt) to 100 gpt, such as a lower limit selected from any one of 1, 2, 3, 4, 5 gpt to an upper limit selected from any one of 10, 20, 30, 40, 50, 100 gpt, where any lower limit may be paired with any upper limit.

Intensifiers

In one or more embodiments, the acid mixture may contain an intensifier. An intensifier, or a corrosion inhibitor intensifier, refers to an additive that is incorporated into the acid mixture to enhance the performance of a corrosion inhibitor, such as MCI and DCI. The intensifier may be an inorganic or organic compound, and in one or more embodiments, the intensifier may include, but is not limited to, at least one of formic acid and potassium iodide (KI).

In one or more embodiments, the intensifier may be formic acid and the acid mixture may contain formic acid in an amount ranging from about 2 g/100 mL of acid mixture to 10 g/100 mL of acid mixture, such as a lower limit selected from any one of 2 g/100 mL of acid mixture, 3 g/100 mL of acid mixture, 3.5 g/100 mL of acid mixture, 3.9 g/100 mL of acid mixture, 4.0 g/100 mL of acid mixture, to an upper limit selected from any one of 5.0 g/100 mL of acid mixture, 6.0 g/100 mL of acid mixture, 6.5 g/100 mL of acid mixture, 7.0 g/100 mL of acid mixture, 8.0 g/100 mL of acid mixture, 9.0 g/100 mL of acid mixture, and 10.0 g/100 mL of acid mixture, where any lower limit may be paired with any upper limit.

In one or more embodiments, the intensifier may be KI and the acid mixture may contain KI in an amount ranging from about 0.1 g/100 mL of acid mixture to 5 g/100 mL of acid mixture, such as a lower limit selected from any one of 0.1 g/100 mL of acid mixture, 0.2 g/100 mL of acid mixture, 0.3 g/100 mL of acid mixture, and 0.4 g/100 mL of acid mixture, to an upper limit selected from any one of 0.5 g/100 mL of acid mixture, 0.6 g/100 mL of acid mixture, 0.7 g/100 mL of acid mixture, 0.8 g/100 mL of acid mixture, 0.9 g/100 mL of acid mixture, 1.0 g/100 mL of acid mixture, 2.0 g/100 mL of acid mixture, 3.0 g/100 mL of acid mixture, 4.0 g/100 mL of acid mixture, and 5.0 g/100 mL of acid mixture, where any lower limit may be paired with any upper limit.

In one or more embodiments, the intensifier comprised in the acid mixture may include formic acid and KI in the above-mentioned ranges.

Other Additives

In one or more embodiments, the acid mixture may optionally include additional additives which may be solid, or liquid. Examples of such additional additives may include, but are not limited to, corrosion inhibitors other than the monoamine and diamine corrosion inhibitors, friction reducers, non-emulsification agents, anti-sludging agents, pH-adjusting agents, pH-buffers, oxidizing agents, enzymes, lost circulation materials, scale inhibitors, surfactants, clay stabilizers, paraffin inhibitors, asphaltene inhibitors, penetrating agents, clay control additives, reducers, oxygen scavengers, emulsifiers, foamers, gases, derivatives thereof, and combinations thereof. The acid mixture may also include fresh water and brine.

Properties—Acid Mixture

In one or more embodiments, the acid mixture provides reduced corrosion of metal, such as steel, in the acid treatment operation when compared to an acid solution without a corrosion inhibitor or acid solution containing a conventional corrosion inhibitor. Such reduction of steel corrosion may be characterized by conducting an acid immersion test of a metal sample to determine various parameters, such as a corrosion rate of the metal sample in the acid mixture or an inhibition efficiency % of the metal sample.

As noted above, an acid treatment operation may involve pumping acid into a wellbore or formation using an "acidic fluid circulation system" that may include parts such as pumps, mixing tanks, coiled tubing, injection tubing and production tubing. Some of these parts may be entirely or partially made of steel, such as low carbon steel, which is susceptible to acid corrosion. The acidic fluid circulation system may be different from or the same as, the fluid circulation system used in the drilling or oil and gas extraction operations. In one or more embodiments, a portion of the system used in drilling or oil and gas extraction operation may be used in the acid treatment operation.

In the present disclosure, "steel parts" refer to any portion or parts of the acidic fluid circulation system made of steel and that are susceptible to corrosion when exposed to an acidic liquid. In one or more embodiments, the steel parts may be produced from coiled tubing steel having a chemical composition as shown in Table 1:

TABLE 1

| Element | Fe | Mn | Cr | Si | Cu | Ni | C | Al | Se |
|---|---|---|---|---|---|---|---|---|---|
| Wt % | 97.4 | 0.8 | 0.58 | 0.33 | 0.279 | 0.204 | 0.14 | 0.041 | 0.039 |
| Element | N | Ta | P | Ti | W | Co | Sn | S | As |
| Wt % | >0.019 | 0.018 | 0.016 | 0.015 | 0.013 | 0.01 | 0.0091 | 0.0083 | 0.0066 |

The corrosion rate of metal in a specific acidic liquid may be determined by first obtaining the weight loss of a metal sample as a result of acid immersion. For the purpose of obtaining the corrosion rate, steel having the composition as provided in Table 1 may be used as a material for the metal sample. The weight loss is determined by subtracting the metal sample weight after the acid immersion from the weight before the acid immersion. The corrosion rate is then calculated by dividing the weight loss of the sample by the total surface area of the metal sample. The corrosion rate (CR) has a unit of weight over area, such as lb/ft$^2$ or g/cm$^2$, and is expressed as follows:

$$\text{corrosion rate} = \frac{(W_i - W_f)}{SA}$$

where $W_i$ is the sample weight before acid immersion, $W_f$ is the sample weight after acid immersion, and SA is the total surface area of the sample. Because the weight loss is dependent on the duration of the acid exposure, a specific immersion time may be established based on what is appropriate for a specific application or by consulting a test standard. In one or more embodiments, the immersion time to determine the corrosion rate may be 1 hour, 2 hours, 4 hours, 6 hours, 10 hours, 15 hours, 20 hours, and 24 hours.

Another method to characterize the effectiveness of a corrosion inhibitor or a combination of compounds, such as a corrosion inhibitor and an intensifier or an acid additive, against acid corrosion, is by determining an inhibition efficiency %. The inhibition efficiency % represents a percentage ratio of the metal sample weight loss in a baseline acid solution and an acid mixture. The inhibition efficiency % may be expressed as follows:

$$\text{inhibition efficiency \%} = \left(\frac{W_0 - W_1}{W_0}\right) \times 100$$

where $W_0$ is the sample weight loss in the baseline acid solution, and $W_1$ is the sample weight loss in the acid mixture including the corrosion inhibitor. The baseline acid solution may be an acid solution having the same acid concentration as the acid mixture, and may or may not contain a corrosion inhibitor or other compounds, depending on which compound is being investigated. For example, in order to study the effectiveness of MCI, an acid mixture containing MCI may be prepared and an acid solution having the same acid concentration as the acid mixture without MCI may be used as the baseline acid solution. In another instance, in order to study the combined effectiveness of MCI and an acid additive, an acid mixture containing MCI and an acid additive may be prepared, and an acid solution containing the same amount of MCI and having the same concentration as the acid mixture may be used as the baseline acid solution.

The effectiveness of a corrosion inhibitor may be determined by obtaining the corrosion rate of a metal sample in the acid mixture containing the corrosion inhibitor and comparing to an acceptable corrosion rate value. The acceptable corrosion rate value may be established based on the requirements of a specific operation or application, or may be obtained by consulting standards established by various organizations and industries.

In the present disclosure, the acceptable corrosion rate values at different temperature ranges are defined as provided in Table 2, which is based on the immersion time of 6 hours. 6 hours immersion time may be a typical time used to assess corrosion inhibitor for matrix acidizing treatments and the acceptable corrosion rate is a function of temperature as given in Table 2.

TABLE 2

| Temperature (° F.) | Temperature (° C.) | Corrosion rate (lb/ft$^2$) |
|---|---|---|
| Up to 200 | Up to 93 | 0.02 |
| 201-250 | 94-121 | 0.05 |
| 251-275 | 122-135 | 0.075 |
| 276 and up | 136 and up | 0.09 |

In one or more embodiments, the acid mixture may provide reduced acid corrosion such that the corrosion rate of the steel parts, based on the acid immersion time of 6 hours, is below the acceptable corrosion rate as provided in Table 2 at a temperature ranging from about 20° C. to 135° C., such as a lower limit selected from any one of 20, 30, 40, 50, 60, 70, 80, and 90° C. to an upper limit of 100, 110, 120, 130, and 135° C., where any lower limit may be paired with any upper limit. The corrosion rate of the steel parts of the acidic fluid circulation system may be determined by obtaining a metal sample made of the same steel as the steel parts of the acidic fluid circulation system or a portion of the steel parts of the acidic fluid circulation system and immerse in the acidic mixture at a specific temperature. In one or more embodiments, the metal samples to determine the corrosion rate of the steel parts of the acidic fluid circulation system made be produced from a coiled tubing steel.

Method for Inhibiting Corrosion in Acid Treatment

In one aspect, embodiments herein relate to a method for inhibiting corrosion in acid treatment.

In one or more embodiments, the method may include introducing an acid mixture comprising hydrochloric acid and a monoamine corrosion inhibitor (MCI) into at least one of a subterranean formation and a subterranean wellbore. The acid mixture may be introduced to the subterranean formation or a wellbore using an acidic fluid circulation system, as described in the previous section.

In one or more embodiments, the method may further include maintaining the acid mixture in at least one of the subterranean formation and the subterranean wellbore for a duration of the subterranean acid treatment operation. During the acid treatment operation, the acid mixture dissolves a portion of the surface buildup or formation, depending on the type of acid treatment operation being conducted, while providing acid inhibiting effect for the steel parts of the acidic fluid circulation system. In one or more embodiments, the acid mixture may further contain at least one of DCI, an acid additive and intensifier to further enhance the corrosion inhibiting property of the acid mixture.

In one or more embodiments, the method may further include maintaining the acid mixture in the at least one of the subterranean formation and the subterranean wellbore such that the concentrations of MCI, and optionally at least one of DCI, the acid additive and the intensifier are maintained in the ranges as provided in the previous sections. The concentrations of MCI, DCI, the acid additive and intensifier may be obtained by collecting and analyzing a sample of the acid mixture in the subterranean formation or wellbore periodically, or continuously monitoring by using sensors which can detect the aforementioned compounds in the acid mixture. The concentrations of the compounds may be adjusted by introducing additional material as required. The additional material may be introduced by introducing the acid mixture initially introduced into the subterranean formation/wellbore. In other embodiments, the additional material may be an acid mixture having a different composition than the acid mixture initially introduced, or a component of the acid mixture that requires adjustment.

In one or more embodiments, the method may inhibit corrosion such that the corrosion rate of steel parts of an acidic fluid circulation system in the acid mixture is within the acceptable corrosion rate, when the temperature is in a range of 20° C. to 135° C.

EXAMPLES

The following examples are provided to illustrate embodiments of the present disclosure. The Examples are not intended to limit the scope of the present invention, and they should not be so interpreted.

Production Example 1

A monoamine corrosion inhibitor (MCI) N, N-diallyl N-propargyl 1-dodecyl ammonium chloride was prepared by first reacting dodecylamine and allyl chloride in a molar ratio of 1 to 2 to produce N,N-diallyldodecylamine. The yield of N,N-diallyldodecylamine was 86%. 2.65 g (10 mmol) of N,N-diallyldodecylamine was dissolved in 4.0 cm$^3$ of acetone and then 2.24 g (30 mmol) of propargyl chloride was added to produce a solution. The solution was stirred under nitrogen in a closed vessel at 78° C. for 24 hours to produce a reaction mixture. The reaction mixture was cooled to room temperature and the quaternary salt of N-diallyl N-propargyl 1-dodecyl ammonium chloride was separated from the reaction mixture by adding 25 cm$^3$ of ether, and decanting the upper ether layer containing unreacted starting materials. The remaining oily residue after decanting was dissolved in approximately 5 cm$^3$ of methanol and the addition and decanting of ether was repeated twice more to fully remove the unreacted starting materials. The remaining residue, which contains N, N-diallyl N-propargyl 1-dodecyl ammonium chloride, was then dried under vacuum at 50° C. The residue was weighed periodically and vacuum drying was continued until a constant weight was obtained. The amount of N-diallyl N-propargyl 1-dodecyl ammonium chloride was 3.1 g, corresponding to 91% yield. An elemental analysis of the sample was conducted using NMR to characterize the produced sample. The results of NMR analysis is shown in Table 3:

TABLE 3

| $^1$H NMR spectra | 3H, t, J = 7.0 Hz | 18H, m | 2H, s | 1H, s | 2H, m | 4H, d, J = 5.5 Hz | 2H, s | 4H, m | 2H, m |
|---|---|---|---|---|---|---|---|---|---|
| δ, ppm (CDCl3) | 0.89 | 1.10-1.31 | 1.91 | 3.09 | 3.41 | 4.3 | 4.63 | 5.8 | 6.08 |

Production Example 2

A diamine corrosion inhibitor (DCI), N, N-diallyl-N-propargyl-N'-formyl-1, 12-diaminododacane salt, was prepared with N, N-diallyl-N'-formyl-1, 12-diaminododacane as one of the starting material, which is a reaction product of 1, 12-dodecanediamine and allyl formyl. 2.54 g (34.0 mmol) of propargyl chloride was added to a solution containing 7.00 g (21.6 mmol) of N, N-diallyl-N'-formyl-1, 12-diaminododacane and 10 cm$^3$ of acetone, and the mixture was stirred under N$_2$ in a closed vessel at 70° C. for 10 hours to react the constituents. The mixture was cooled to room temperature and the quaternary salt was separated from the mixture by adding 25 cm$^3$ of ether. After decanting the upper ether layer, the oily residue was dissolved in minimum quantity of methanol (approximately 5 cm$^3$) and again separated from the solvent by adding 25 cm$^3$ ether. This separation procedure was repeated 3 times to ensure that any unreacted starting material is removed. The oily liquid was dried under vacuum at 50° C. until no weight loss was observed to obtain N, N-diallyl-N-propargyl-N'-formyl-1, 12-diaminododacane salt. The amount of N, N-diallyl-N-propargyl-N'-formyl-1, 12-diaminododacane salt was 8.35 g, corresponding to the yield of 94%. An elemental analysis of the sample was conducted using NMR to characterize the produced sample. The results of NMR analysis were: $δ_H$ (D$_2$O) 1.18 (16H, m), 1.37 (2H, m), 1.64 (2H, m), 3.06 (2 H, t, J 7.0 Hz), 3.15 (3H, m), 3.85 (4 H, app d, J 7.3 Hz), 3.99 (2 H, s), 5.63 (4H, m), 5.86 (2H, m), 7.87 (1 H, s); $δ_C$ 22.09, 26.40, 27.13, 29.14, 29.34, 29.51, 29.57, 29.71, 29.82, 29.84, 38.85, 49.34, 59.16, 61.59, 71.67, 82.46, 124.42, 130.24, 164.66 (diaoxane: 67.4); $v_{max}$ (neat) 3238, 3038, 2926, 2854, 2122, 1668, 1540, 1468, 1382, 1242, 1034, 966, 846, 724 cm$^{-1}$

Example 1

An acid mixture was prepared by mixing 100 mL of 15 wt % concentration hydrochloric acid, and 10 mg of N, N-diallyl N-propargyl 1-dodecyl ammonium chloride (MCI concentration of 100 ppm)

Example 2

An acid mixture was prepared by mixing 100 mL of 15 wt % concentration hydrochloric acid, 10 mg of N, N-diallyl N-propargyl 1-dodecyl ammonium chloride (MCI concentration of 100 ppm), and 0.4 g of potassium iodide (KI).

Example 3

100 mL of an acid mixture was prepared by mixing an appropriate amount of 28 wt % concentration hydrochloric acid, 40 mg of N, N-diallyl N-propargyl 1-dodecyl ammonium chloride (MCI concentration of 400 ppm), 3.9 mL of 0.9 M formic acid and 0.4 g of potassium iodide.

Example 4

100 mL of an acid mixture was prepared by mixing an appropriate amount of 28 wt % concentration hydrochloric acid, 40 mg of N, N-diallyl N-propargyl 1-dodecyl ammonium chloride (MCI concentration of 400 ppm), 6.5 mL of 0.9 M formic acid and 0.4 g of potassium iodide.

Example 5

100 mL of an acid mixture was prepared by mixing an appropriate amount of 28 wt % concentration hydrochloric acid, 5 mg of N, N-diallyl N-propargyl 1-dodecyl ammonium chloride (MCI concentration of 50 ppm), and an appropriate amount of M295 $H_2S$ scavenger available from Schlumberger Technology Corporation such that the concentration of the scavenger was 5 gallons per 1000 gallon acid mixture (gpt).

Example 6

100 mL of an acid mixture was prepared by mixing an appropriate amount of 28 wt % concentration hydrochloric acid, 5 mg of N, N-diallyl N-propargyl 1-dodecyl ammonium chloride (MCI concentration of 50 ppm), and an appropriate amount of an iron control agent, which is an acetic acid and citric acid mixture available from Schlumberger Technology Corporation, such that the concentration of the control agent was 10 gpt.

Example 7

100 mL of an acid mixture was prepared by mixing an appropriate amount of 28 wt % concentration hydrochloric acid, 5 mg of N, N-diallyl N-propargyl 1-dodecyl ammonium chloride (MCI concentration of 50 ppm), and an appropriate amount of U-66 mutual solvent available from Schlumberger Technology Corporation such that the concentration of the mutual solvent was 100 gpt.

Example 8

100 mL of an acid mixture was prepared by mixing an appropriate amount of 28 wt % concentration hydrochloric acid, 5 mg of N, N-diallyl N-propargyl 1-dodecyl ammonium chloride (MCI concentration of 50 ppm), and an appropriate amount of F-103 water-wetting surfactant available from Schlumberger Technology Corporation such that the concentration of the surfactant was 1 gpt.

Example 9

100 mL of an acid mixture was prepared by mixing an appropriate amount of 28 wt % concentration hydrochloric acid, 10 mg of N, N-diallyl N-propargyl 1-dodecyl ammonium chloride (MCI concentration of 100 ppm), 10 mg of N,N-diallyl N-propargyl-N'-formyl-1,12-diaminododacane diamine corrosion inhibitor (DCI) (DCI concentration of 100 ppm), 6.5 mL of 0.9 M formic acid, and 0.4 g of potassium iodide.

Comparative Example 1

An acid mixture was prepared by mixing 100 ml of 28 wt % concentration hydrochloric acid, and 5 mg of N, N-diallyl N-propargyl 1-dodecyl ammonium chloride (MCI concentration of 50 ppm).

Comparative Example 2

An acid mixture was prepared by mixing 100 ml of 28 wt % concentration hydrochloric acid, 20 mg of N, N-diallyl N-propargyl 1-dodecyl ammonium chloride (MCI concentration of 200 ppm), 6.5 mL of 0.9 M formic acid, and 0.4 g of potassium iodide.

Corrosion Rate Evaluation

The corrosion rate of steel in the acid mixtures of EXAMPLES 1-4 was studied by preparing steel coupons, weighing each coupon prior to testing ("initial weight") and immersing the coupons in each acid mixture. The steel coupons have elemental compositions as shown in Table 1 in the previous section. The coupons were immersed in the acid mixtures under specific conditions as provided in Table 4.

TABLE 4

| acid mixture | corrosion inhibitor | acid | intensifier | test temp. (° F.) | test duration (h) |
|---|---|---|---|---|---|
| EXAMPLE 1 | 100 ppm MCI | 100 ml 15% HCl | None | 176 | 6 |
| EXAMPLE 2 | 100 ppm MCI | 100 ml 15% HCl | 0.4 g KI | 220 | 6 |
| EXAMPLE 3 | 400 ppm MCI | 100 ml 28% HCl | 3.9 mL Formic Acid 0.4 g KI | 250 | 6 |
| EXAMPLE 4 | 400 ppm MCI | 100 ml 28% HCl | 6.5 mL Formic Acid 0.4 g KI | 250 | 6 |

The steel coupons were removed from the acid mixture after the specified test duration and the weighed to obtain "final weight". Weight losses, weight loss % and corrosion rates were calculated using the method as described in the previous section, which are shown in Table 5:

TABLE 5

| acid mixture | specimen | initial weight (g) | final weight (g) | weight loss (g) | weight loss % | avg. CR (lb/ft²/6 hour) | acceptable CR (lb/ft²/6 hour) |
| --- | --- | --- | --- | --- | --- | --- | --- |
| EXAMPLE 1 | 1 | 12.1469 | 12.0830 | 0.06390 | 0.5261 | 0.01114 | 0.02 |
| EXAMPLE 2 | 1 | 11.4756 | 11.4638 | 0.01180 | 0.1028 | 0.0021 | 0.05 |
| EXAMPLE 3 | 1 | 12.0901 | 11.9537 | 0.1364 | 1.128 | 0.0336 | 0.05 |
|  | 2 | 11.7986 | 11.5494 | 0.2492 | 2.112 |  |  |
| EXAMPLE 4 | 1 | 12.3001 | 12.1766 | 0.1235 | 1.004 | 0.0394 | 0.05 |
|  | 2 | 12.0818 | 11.7530 | 0.3288 | 2.721 |  |  |

Table 5 shows that the corrosion rates (CR) of the steel coupons, which represents the steel part of the acidic fluid circulation system, immersed in various acid mixtures containing MCI were within the acceptable CR. Furthermore, EXAMPLES 1-4 illustrates that the effectiveness of the MCI may be enhanced by incorporating intensifiers such as KI (EXAMPLE 2). The CR of EXAMPLE 2 is substantially lower than that of EXAMPLE 1, which does not contain KI, even though the test temperature was higher, showing that addition of KI improves the performance of the corrosion inhibitor. EXAMPLES 3 and 4 show that incorporation of both formic acid and KI results in the CR to be within the acceptable range even though the acid concentration and the test temperature were substantially higher than EXAMPLES 1 and 2, indicating that further improvement may be possible by incorporating both formic acid and KI as the intensifiers.

Effect of Acid Additives on Inhibition Efficiency %

Figure 2:
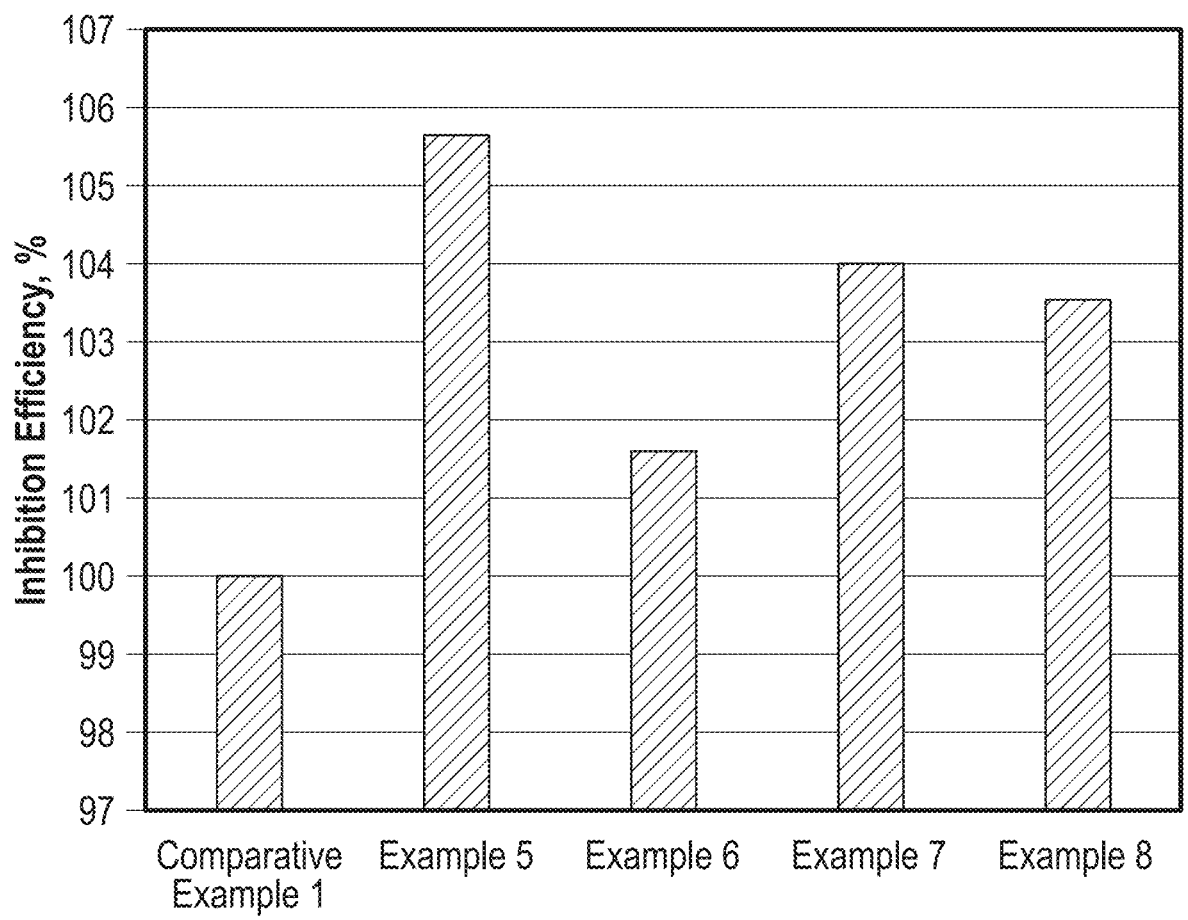
FIG. 2 is a plot of inhibition efficiency % obtained from steel coupons treated in the acid mixture of EXAMPLES 5-8 and COMPARATIVE EXAMPLE 1 in accordance with one or more embodiments.

The effect of acid additives on the corrosion inhibition property of acid mixtures was studied by immersing steel coupons in the acid mixtures of EXAMPLES 5-8 and COMPARATIVE EXAMPLE 1 and obtaining the inhibition efficiency %. New steel coupons, same type as the coupons described in the corrosion rate evaluation study, were obtained, weighed and then immersed in the acid mixtures of EXAMPLES 5-9 for 4 hours at 80° C. After 4 hours, the steel coupons were removed from the acid mixtures and weighed. The inhibition efficiency % was calculated as described in the previous section using COMPARATIVE EXAMPLE 1 as the baseline mixture. The inhibition efficiency % of EXAMPLES 5-8 is shown in FIG. 2. FIG. 2 shows that examples of the acid mixtures including an acid additive and MCI have higher inhibition efficiency % over the baseline acid mixture, which only contained MCI, indicating that the performance of the acid mixture comprising MCI may be improved further by incorporating the acid additives.

Combined Effect of Monoamine and Diamine Corrosion Inhibitor

Figure 3A:
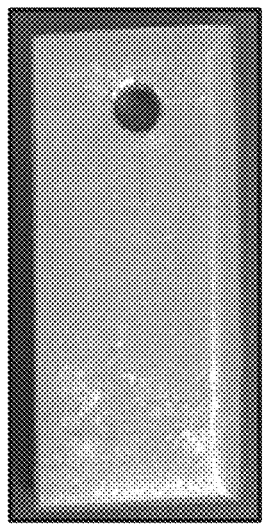
FIGS. 3A-B are photographs illustrating the surface conditions of steel coupons before acid treatment in accordance with one or more embodiments.
Figure 3B:
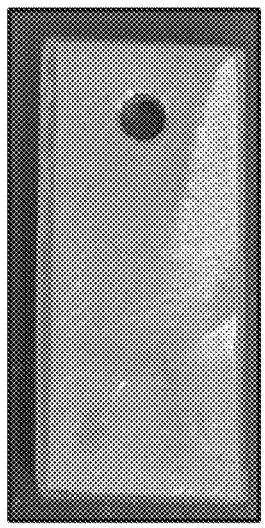
Figure 3C:
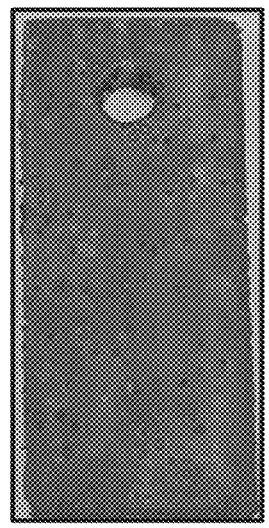
FIGS. 3C-D are photographs illustrating the surface conditions of steel coupons after acid treatment in the acid mixture of COMPARATIVE EXAMPLE 2 in accordance with one or more embodiments
Figure 3D:
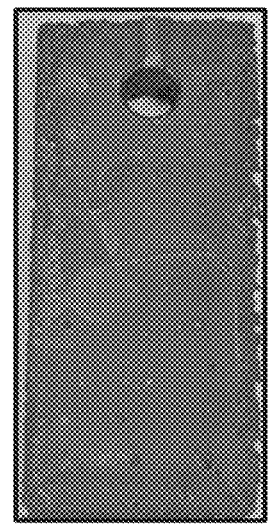
Figure 4A:
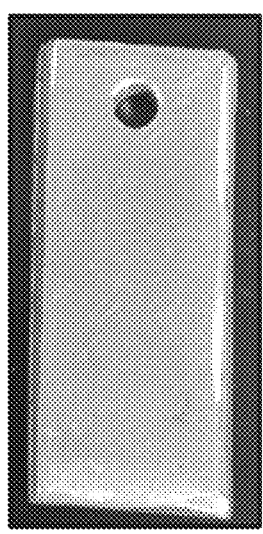
FIGS. 4A-B are photographs illustrating the surface conditions of steel coupons before acid treatment in accordance with one or more embodiments.
Figure 4B:
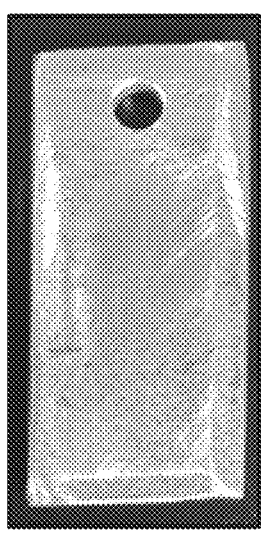
Figure 4C:
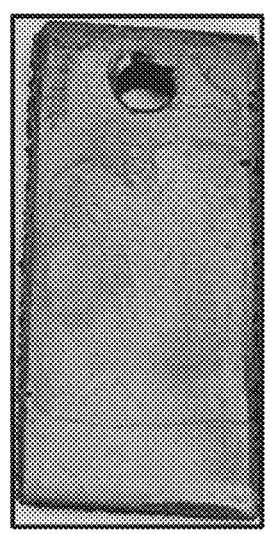
FIGS. 4C-D are photographs illustrating the surface conditions of steel coupons after acid treatment in the acid mixture of EXAMPLE 9 in accordance with one or more embodiments.
Figure 4D:
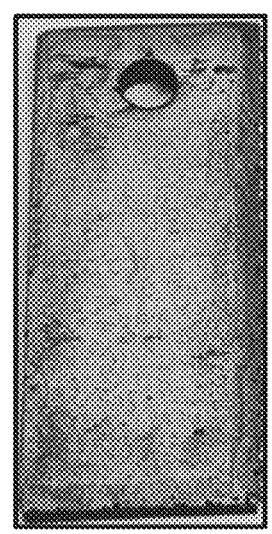

A study was conducted to investigate an acid mixture containing MCI and DCI and its effect on the corrosion inhibition property. Steel coupons were immersed in the acid mixture of EXAMPLE 9 and COMPARATIVE EXAMPLE 2 for 24 hours at 93.3° C. FIGS. 3A and B, and FIGS. 4A and B show the surface appearance of the steel coupons before the coupons were immersed in the acid mixtures. FIGS. 3C and D shows the surface appearance of the coupons of FIGS. 3A and B after immersed in the acid mixture of COMPARATIVE EXAMPLE 2, which contains 200 ppm of MCI but does not contain DCI. FIGS. 3C and D shows that the acidizing of steel coupons in the acid mixture of COMPARATIVE EXAMPLE 2 resulted in the formation of circular marks on the coupon surface, indicating the presence of pitting corrosion. Meanwhile, FIGS. 4C and D show that the coupons immersed in the acid mixture of EXAMPLE 9, which contains 100 ppm of MCI and 100 ppm DCI. did not result in the formation of the circular marks. The total amount of corrosion inhibitor in both EXAMPLE 9 and COMPARATIVE EXAMPLE 2 was identical and therefore, it may be concluded that the combined use of MCI and DCI provides further improvement of corrosion inhibition properties of the acid mixture.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112 (f) for any limitations of any of the claims herein, except for those in which the claim expressly uses the words 'means for' together with an associated function.

What is claimed is:

1. An acid mixture, comprising:
   hydrochloric acid;
   a monoamine corrosion inhibitor;
   a diamine corrosion inhibitor;
   an acid additive; and
   an intensifier comprising formic acid and potassium iodide,
   wherein the acid mixture comprises formic acid in an amount ranging from 3.5 g/100 mL to 10 g/100 mL of the acid mixture, and
   wherein the acid additive is comprised in an amount of 1 gallon to 100 gallons per 1000 gallons of the acid mixture (gpt).

2. The acid mixture of claim 1, wherein an amount of the monoamine corrosion inhibitor in the acid mixture ranges from 10 ppm to 400 ppm.

3. The acid mixture of claim 1, wherein the monoamine corrosion inhibitor comprises N, N-diallyl N-propargyl 1-dodecyl ammonium chloride.

4. The acid mixture of claim 1, wherein the diamine corrosion inhibitor comprises N,N-diallyl N-propargyl-N'-formyl-1,12-diaminododacane salt.

5. The acid mixture of claim 1, wherein the acid additive comprises at least one of an $H_2S$ scavenger, an iron control agent, a mutual solvent, and a water-wetting surfactant.

6. The acid mixture of claim 1, wherein the hydrochloric acid has a concentration ranging from 10 wt % to 30 wt %.

* * * * *